(12) United States Patent
Vallejo

(10) Patent No.: US 8,562,298 B2
(45) Date of Patent: Oct. 22, 2013

(54) VERTICAL-AXIS WIND TURBINE

(76) Inventor: Roberto Vallejo, Hawthorne, CA (US)

( * ) Notice: Subject to any disclaimer, the term of this patent is extended or adjusted under 35 U.S.C. 154(b) by 549 days.

(21) Appl. No.: 12/886,557

(22) Filed: Sep. 20, 2010

(65) Prior Publication Data

US 2011/0164977 A1     Jul. 7, 2011

Related U.S. Application Data

(60) Provisional application No. 61/244,847, filed on Sep. 22, 2009.

(51) Int. Cl.
    *F03D 3/06*     (2006.01)
(52) U.S. Cl.
    USPC .......................................... 416/197 A; 415/71
(58) Field of Classification Search
    USPC ................... 415/4.2, 4.4, 71, 72, 74, 75, 907; 416/176, 197 R, 197 A, 197 B, DIG. 9, 416/227 R, DIG. 4
    See application file for complete search history.

(56) References Cited

U.S. PATENT DOCUMENTS 3,941,504 A * 3/1976 Snarbach .................. 416/197 A
4,365,934 A * 12/1982 Mason ...................... 416/197 A

* cited by examiner

*Primary Examiner* — Richard Edgar

(57) ABSTRACT

A vertical axis wind turbine having a vertical rotating axle and a plurality of blades each attached to an upper portion to the rotating axle and at the bottom portion to a convex base dome attached to and rotable with the vertical axle. Each blade wraps around the vertical axle and has a radial width that increases from its upper portion to its lower portion while supporting an open brow section forming a cup-like space and a wedge-like stiffener section.

19 Claims, 6 Drawing Sheets

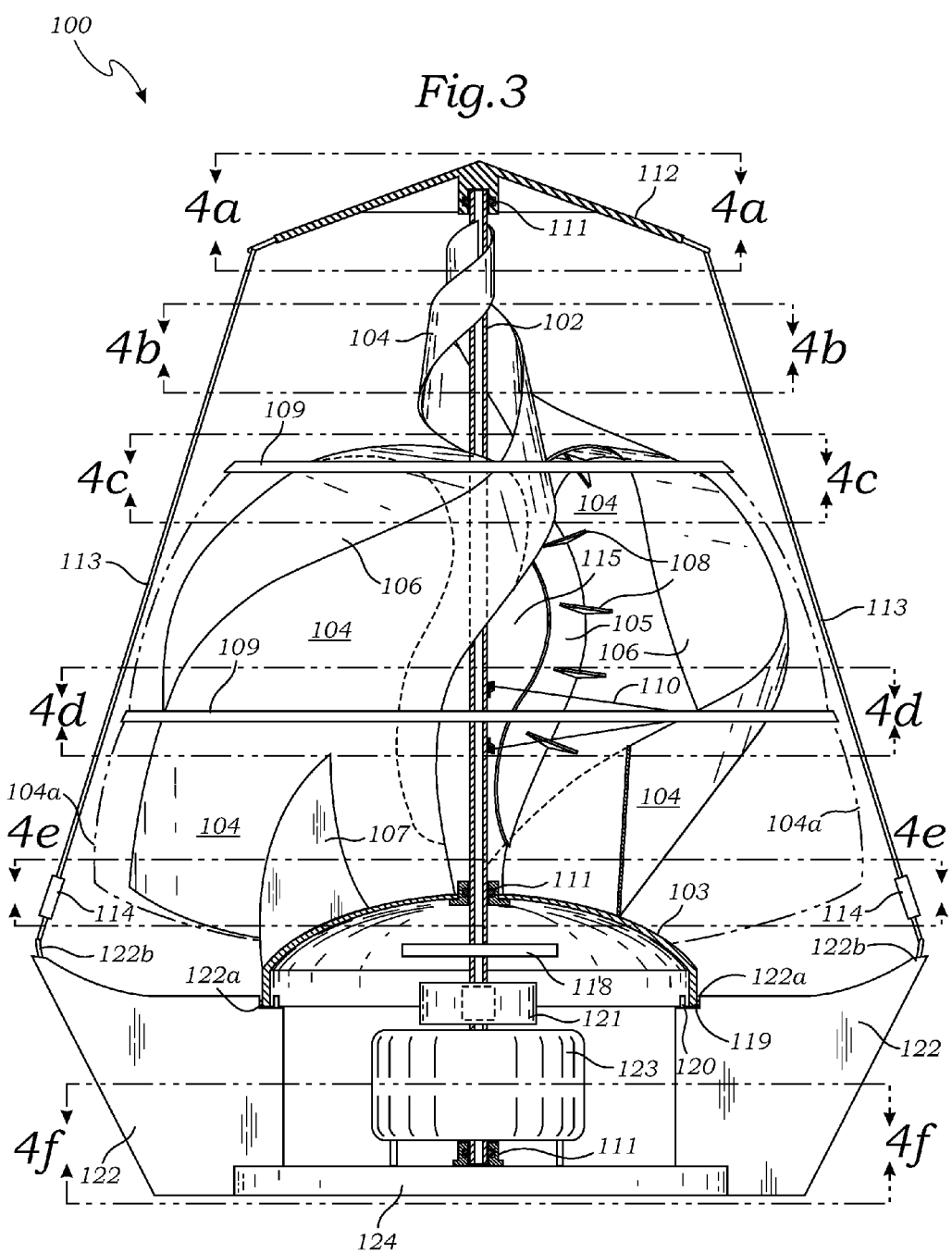

VERTICAL-AXIS WIND TURBINE

CROSS REFERENCE TO RELATED APPLICATION

This application claims the priority of U.S. provisional application 61/244,847 filed on Sep. 22, 2009

BACKGROUND

1. Field of Invention

This invention relates to wind turbines and more specifically, to an improved vertical-axis wind turbine. (VAWT).

2. Description of Related Art

A wind turbine or wind generator is a rotating machine that converts the kinetic energy in wind into electric energy via gears and generators, or other forms of energy usable by men. Wind energy offers many advantages, which explains why it is the fastest-growing alternative energy source in the world. Because wind energy is fueled by the wind, which in turn is fueled by the sun, it is a clean and inexhaustible fuel source. Wind energy does not pollute the atmosphere like power plants that rely on combustion of fossil fuels such as coal or gas. Wind turbines also do not produce atmospheric emissions that cause acid rain or greenhouse gasses. Wind energy is a domestic source of energy and decreases a nation's dependence on foreign supplied energy such as oil, and creates local well paying jobs. Wind supply is readily abundant in most areas. Wind energy relies on the renewable power of the wind, which cannot be exhausted. Wind energy is also one of the lowest-priced renewable energy technologies available today, costing between 4 and 8 cents per kilowatt-hour, depending upon the wind resource and project financing of the particular project.

Generally, wind turbines can be separated into two types based by the axis in which the turbine axis rotates. Turbines that rotate around a horizontal axis are referred to as horizontal-axis wind turbines ("HAWT"). They are the most common type of wind turbine in use today and are typically seen in open spaces along highways in areas such as Palm Springs and Tehachapi, Calif. Turbines that rotate around a vertical axis are referred to as vertical-axis wind turbines ("VAWT") and are less frequently used because they are less efficient.

A HAWT typically has a main rotor shaft and an electrical generator mounted at the top of a support tower, and must be pointed into the wind. Small turbines are pointed by a simple wind vane, while large turbines generally use a wind sensor coupled with a servo motor that rotates the turbine and all its components to face the wind. Most turbines have a gearbox, which turns the slow rotation of the blades into a quicker rotation that is more suitable to drive an electrical generator. Since the tower produces turbulence behind it, the turbine is usually pointed upwind of the tower. Turbine blades are made stiff to prevent the blades from being pushed into the tower by high winds. Additionally, the blades are placed a considerable distance in front of the tower and are sometimes tilted up a small amount to prevent them from hitting the towers in high winds. In very strong winds the blades have to be stopped all together to prevent the blades from hitting the tower. Downwind machines have been built, despite the problem of turbulence (mast wake), because they do not need an additional mechanism for keeping them in line with the wind, and because in high winds the blades can be allowed to bend which reduces their swept area and thus their wind resistance. Since cyclic turbulence may lead to fatigue failures most HAWTs are upwind machines.

HAWTs suffer from a number of additional disadvantages. The tall towers and blades up to 90 meters or longer and are difficult to transport. Transportation can reach 20% of equipment costs. In addition, tall HAWTs are difficult to install, needing very tall and expensive cranes and skilled operators. Massive tower and foundations construction is required to support the heavy blades, gearbox, and generator. Their height makes them obtrusively visible across large areas, disrupting the appearance of the landscape and sometimes creating local opposition. HAWTs require an additional yaw control mechanism to turn the blades toward the wind. In addition, maintenance of the tower, wings, generator and other gear high up above the ground is very expensive. They also create a constant humming noise when rotating making them a problem close to urban or suburban areas.

Vertical-axis wind turbines (or VAWTs) have the main rotor shaft and blades arranged vertically. Key advantages of this arrangement are that the turbine does not need to be pointed into the wind to be effective, they work with wind from any direction. This is an advantage on sites where the wind direction is highly variable. VAWT are often installed nearer to the base on which they rest, such as the ground or a building rooftop; they can also be mounted at top of tall towers with all the gear (winding coil, gear box, and generator) at ground level. This can provide the advantage of easy accessibility to mechanical components for installation and maintenance. Also VAWT designs do not require a yaw mechanism or extra motors to turn into the wind. In addition, VAWTs generally have lower wind startup speeds than HAWTs. Typically, VAWTs start creating electricity at 6 mph winds. VAWTs may be built at locations where taller structures are prohibited. Moreover, VAWTs situated close to the ground can take advantage of locations where mesas, hilltops, ridgelines, and passes funnel the wind and increase wind velocity.

Examples of VAWTs are disclosed in U.S. Pat. Nos. 5,183,386; 5,405,246; 6,242,818; 7,241,105; and 7,303,369, the disclosures of which are all incorporated herein in their entirety. Yet, many if not all of these VAWTs suffer from one or more of the following disadvantages. Most VAWTs produce energy at only 50% of the efficiency of HAWTs in large part because of the additional drag that they have as the back of the blades rotate into the wind. Having rotors located close to the ground where wind speeds are lower due to wind shear, VAWTs may not produce as much energy at a given site as a HAWT with the same footprint or height.

SUMMARY

The present teaching overcomes the foregoing and other deficiencies of the prior art by providing an improved vertical-axis wind turbine design with much less drag and much more traction on the rotation of the wind turbine.

In an embodiment of the invention, the improved wind turbine comprises: a vertical rotating axle a plurality of blades attached at an upper portion to the vertical rotating axle and at the bottom to a base dome which is attached to the vertical rotating axle and shaped like an up-side down bowl to deflect wind up to the plurality of blades. Each of the plurality of blades has a radial width that increases from the top to the bottom of the turbine and preferably comprising one or more open brow sections forming each a cup like space, and stiffener wedge like sections each disposed between its associated blade and brow section. A portion of each of the plurality of blades wraps around the vertical rotating axle mostly near the top of the turbine, also each of the plurality of blades preferably includes a first front rough side surface for wind traction and a second back smooth side for aerodynamic as frictionless as possible surface. Preferably the plurality of blades including the brow and stiffener sections are formed from a surface of frustum of a cone or have an approximation to that shape and form. The brow sections are open and angled away from the adjacent plane of the respective blade. The wind turbine may further comprise two or more outer rings attached to each of the plurality of blades and brow sections and spokes attached radially from the outer ring to the vertical rotating axle. One or more counter weights per blade and its respective radial guides may be included with the counter weights traveling along the radial guides, always equidistant from the center to maintain the center of gravity. A guiding system coupled with a conventional brake system where the base dome edge glides while rotating along ball bearings, is located at each of radial raised foundations. A winding coil under the dome also acts as energy storage to be released at low wind speeds. A radial foundations with elevated supports off of the ground to elevate the turbine above the ground and to house coils, gears, generator, and to attach at an outer high end, diagonal supports cables to the umbrella like top-support to maintain the turbine plumb, and to reduce the size of mast (vertical axle) and foundation required to maintain turbine plumb, and an inner lower part to house the domes conventional brake and guide system The foregoing, and other features and advantages of embodiments of the invention, will be apparent from the following, more particular description of the preferred embodiments of the invention, the accompanying drawings, and the claims.

BRIEF DESCRIPTION OF THE DRAWINGS

For a more complete understanding of the present invention, the features and advantages thereof, reference is now made to the ensuing descriptions taken in connection with the accompanying drawings briefly described as follows:

FIG. 3 is a vertical view of the turbine shown in FIG. 1, depicting only two blades for clarity, and showing the location of horizontal sections illustrated on FIGS. 4a-4f FIGS. 4a-4f are horizontal sections of the wind turbine cut along the lines 4a-4f in FIG. 3

DETAILED DESCRIPTION OF EMBODIMENTS

Figure 1:
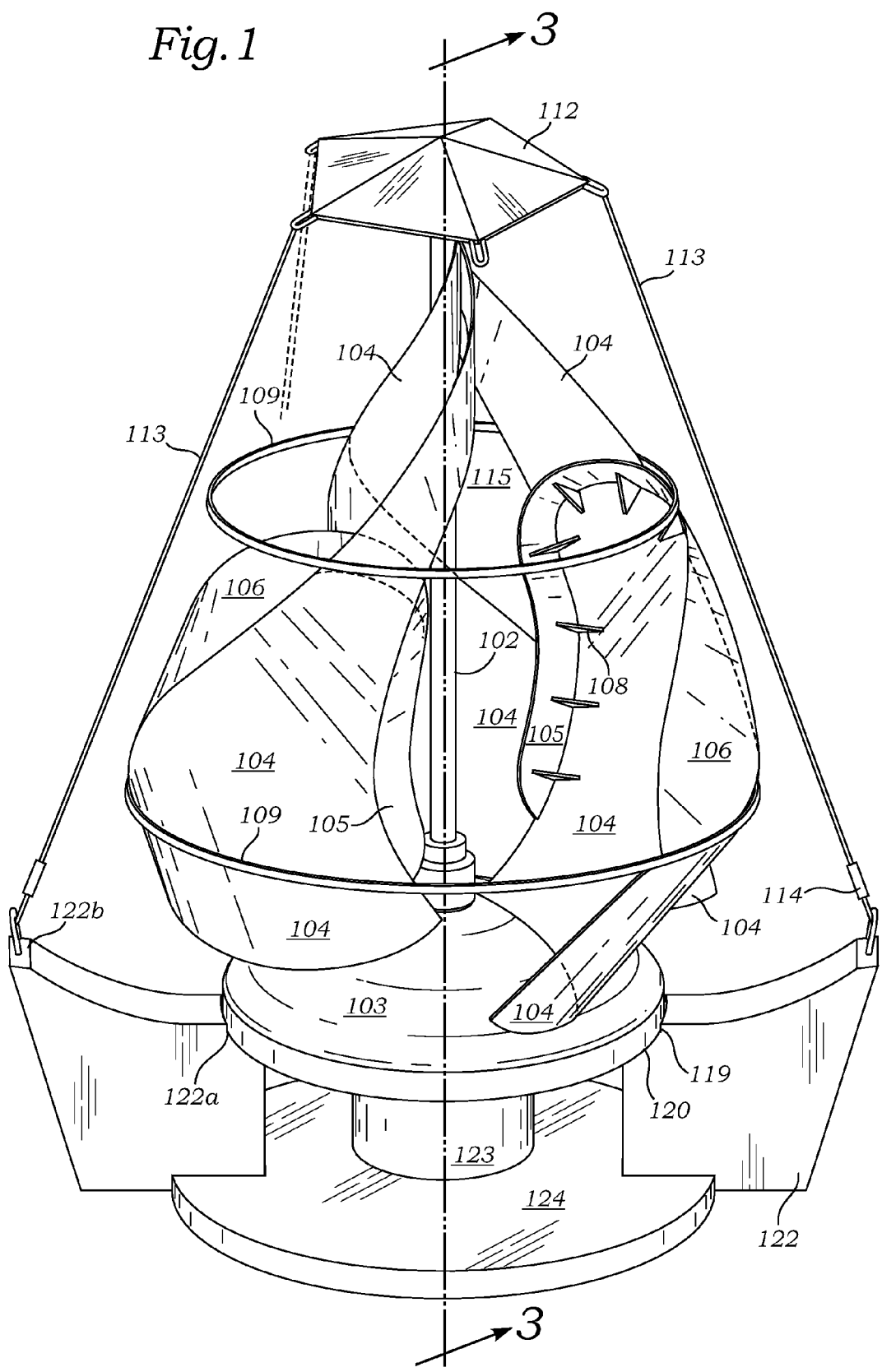
FIG. 1 is an isometric view of a vertical-axis wind turbine according to an embodiment of the invention.

Further features and advantages of the teachings, as well as the structure and operation of various embodiments of the invention, are described in detail below with reference to the accompanying FIGS. 1-7, wherein like reference numerals refer to like elements.

FIGS. 1, and 3 illustrate a vertical-axis wind turbine 100 according to an embodiment of the invention. Particularly, FIG. 1 shows an isometric view of the turbine 100, whereas.

FIG. 3 is a diagrammatic elevation of the turbine 100. As there depicted, the vertical-axis wind turbine 100 comprises an inner fixed vertical axle 101 surrounded by a vertical rotating axle 102. Vertically applied ball bearing units 111 separate the axles. The rotating axle supports a dome 103 coupled with a plurality of outwardly and upwardly extending blades 104 that attach at the top to the rotating axle 102 and at their bottom to the dome 103 in a radial pattern. Each blade 104 includes an array of brows 105 106 and 107 and stiffeners 108 disposed to maintain a form that better catches the wind in a cup like space within each blade. Also a set of support rings 109 with corresponding spokes 110, (like a wheel of a bicycle), attaches to the rotating axle 102 and the blades 104 brows 105-106 to help maintain the turbines shape. The turbine is supported vertically by an array of cables 113 extending from a radial raised foundation high point 122b to an umbrella like support 112 at top of the axle. Each foundation 122 has an inner low point 122a and an outer high point 122b, the inner low point 122a contains a conventional guide 119 for the dome 104 edge coupled with a conventional braking system 120 to stop the turbine for maintenance and repairs; at the foundation high point 122b are anchors for the cables 113 that extend to the top umbrella like support 112. As shown the vertical rotating axle 102 is attached to each of the plurality of the blades 104 and to the base dome 103, while the inner fixed axle 101 is anchored at its base to the central foundation 124 and at top to the umbrella like support 112 and does not rotate. In another embodiment, only a rotating axle 102 with ball bearing unit 111 at top and bottom, the top seats in a ball bearing unit 111 to the umbrella like structure 112 and the bottom seats in a ball bearing unit 111 at the central foundation 124. The vertical rotating axle 102 is supported by the inner fixed axle 101 and by conventional internal ball bearing units 111, as shown in FIGS. 4a-4f, which are placed at the top, bottom, and spaced within and along the rotating axle 102 where forces and stress points are greatest, such as where the base dome 103, rings 109 with spokes 110, and the blades 104 are attached to the rotating axle as discussed below. From top to bottom, the inner fixed axle 101 and vertical rotating axle 102 outside may increase in diameter for ease of assembly or be the same size throughout top to bottom with the outer one larger than the inner one taking into account the size of ball bearings units 111 for the outer axle. Also the vertical axles 101 and 102 are installed vertical and plumb, supported by cables 113 extending from the upper umbrella like structure 112 at top to an outer upper high point 122b of the raised foundation 122 and outward enough to clear the turbine rotating space 104a as depicted in FIG. 3. With wind present, the blades 104 and brows 105-106 and 107 attached to the dome 103 and the vertical rotating axle 102 drive the rotation of the vertical axle 102 and with conventional gears 121 below the dome 103 or on the rotating vertical axle 102 transfer energy to a conventional gear box 121, then to a conventional generator 123.

In another embodiment of the invention, the dome 103 the blades 104 and all its attachments are not attached directly to a vertical axle 101 or 102, but through ball bearings and hence the vertical axis do not rotate when the blades 104 dome 103 and all its attachments are rotating, the energy is transferred directly via the dome 103 to the gear box 121. In still another embodiment of the inventions, the dome 103 blades 104 and all its attachments are attached directly to a vertical rotating axle 102, and there is no fixed axle present, and hence the vertical axle 102 does rotate when wind is driving the rotation of the blades 104 and all its attachments via a ball bearing unit 111 at the top umbrella like structure 112 and bottom central foundation 124. In still another embodiment the dome 103 blades 104 brows 105 106 and 107 and stiffeners 108 are installed upside down with the umbrella like structure still on top, wider than the dome, and supporting vertically the turbine. In still another embodiment the base may not be in the shape of a dome. In other embodiment there may be no base. In such cases an alternate structure may be used to support the blades.

The plurality of blades 104, which may alternatively be referred to as wings, asps, sails, air foils, or propellers, are welded or fused or attached mechanically, by bolts, rivets, pins, or other conventional means to the rotating vertical axle 102 at the top and at the bottom to the base dome 103 which in turn is attached to the vertical rotating axle 102. Around the location where the vertical rotating axle 102 and base dome 103 come together, each blade 104 is attached to the base dome 103 radially, and diagonally to the radius of the dome, as shown in FIGS. 4b-4e, where the inner half of each blade 104 is coupled to the base dome 103 angled to its surface in an acute angle at the back and in an obtuse angle in the front see FIGS. 1 and 3. At the top of the turbine 100, each blade 104 wraps around and is attached mechanically or welded to the vertical rotating axle 102. All components attachments may be by: welding, fussing, bolting, riveting, pins, or any other conventional method proven in similar applications.

In one embodiment of the invention, the inside of each blade 104 features a rough finish on its surface, while the outside features a smooth finish on its surface in order to vary the degree of wind resistance creating aerodynamics over each side that improves the efficiency of the turbine 100. In other words, the outside or back side of each blade 104 is very smooth using finishes like Teflon or the like and is as frictionless as possible, and aerodynamically formed or bend to allow the wind to slide out and about the top, bottom, and edges of the blades 104 and brows 105-106 with very little or no resistance, while directing some of the wind and its force to the inside towards a central open area 115, shown in FIGS. 1, 3 and 4. Some of this wind energy in the central open area 115 will hit and push one or more of the blades 104 and their respective brow 105-106, adding energy to the rotation. The other side, the insides of the blade 104 brow 105-106 combinations is rough and forms the cup like space that creates a resistance forcing the blades 104, brows 105-106, dome 103, rotating vertical axle 102 and all its other attachments to rotate around its axis and with gears 121 on the rotating axle 102 or dome 104 to transfer the energy to the gear box 121 then to the generator 123 and beyond.

The blades 104 are preferably constructed from a semi-rigid or rigid material that is relatively strong and lightweight such as plastic, sheet metals, aluminum, titanium, composite materials such as a fiberglass laminate or carbon composite, or the like. However, other types of material including flexible materials may be used, the identification and implementation of which is readily apparent to one of ordinary skill in the art. For example, the blades 104 may comprise a fabric like material such as canvas, nylon, or Teflon textiles or other materials associated with sailing or water rafting applications. If constructed of flexible material, the blades 104 and brows 105-106 and 107 may include an inner support frame, such as a metal skeleton and/or sail batons, to support the basic shape that catches the wind.

The base dome 103 is convex at its top concave at its bottom much like a bowl turned upside down, with a straight, vertical or semi-vertical rigid and strong, edge for gliding through guides 119 and for braking 120 and supporting heavy loads under strong winds. This dome shape allows wind on the base dome 103 to be deflected and directed upward into the blades 104 and brows 105-106 cup like space. Like the blades 104 the base dome 103 can be made of a strong, rigid, but relatively lightweight material such as plastics, sheet metals, or composites. The base dome 103 directs wind into the blades 104, and the cap like space formed by the blade 104 and brows 105-106. The base dome 103 also acts as a stabilizer to the axles 101 and 102, the blades 104, and the brows 105-106, and 107. The domes' rigid edge is also used to stop the rotation of the turbine for maintenance purposes via a conventional braking system 120. The base dome 103 further protects the components that are located below, the springs 118, electric switchgear, generators 123, gears 121 which are discussed below and shown in FIG. 3, from the natural elements and also provides a safety barrier for the blades 104 above. The base dome 103 is welded or attached mechanically to the vertical rotating axle 102. Also as previously stated the blades 104 are attached to the dome 103 at their bottom, and to the rotating axle 102 at its top.

Each blade 104 may optionally comprise one or more brows 105-106 in front & 107 in back to better catch the kinetic force of the wind while stiffening and lightening the blades 104, the dome 103 and the brows 105-106 and 107 themselves without sacrificing strength (as the distance between attachments such as dome, blades, brows, stiffeners, rings, spokes, narrows or decrease, the material can become thinner and lighter). Each brow 105-106 is attached at 104a in FIG. 6 from a lower inner edge of its associated blade 104 up to about ⅔ height of the blade 104 and then crosses over to the outer edge and continues down the outer edge as shown in FIGS. 1, 2, 3 and 6. Also each brow 105-106 is coupled to its associated blade 104, rings 109 and spokes 110 and or stiffeners 108 shown in FIGS. 1, 3, 4c and 4d. In addition each optional brow 107 is coupled to the back of the blade 104 and to the top of the dome 103, as shown in FIGS. 3 and 4e.

Figure 2:
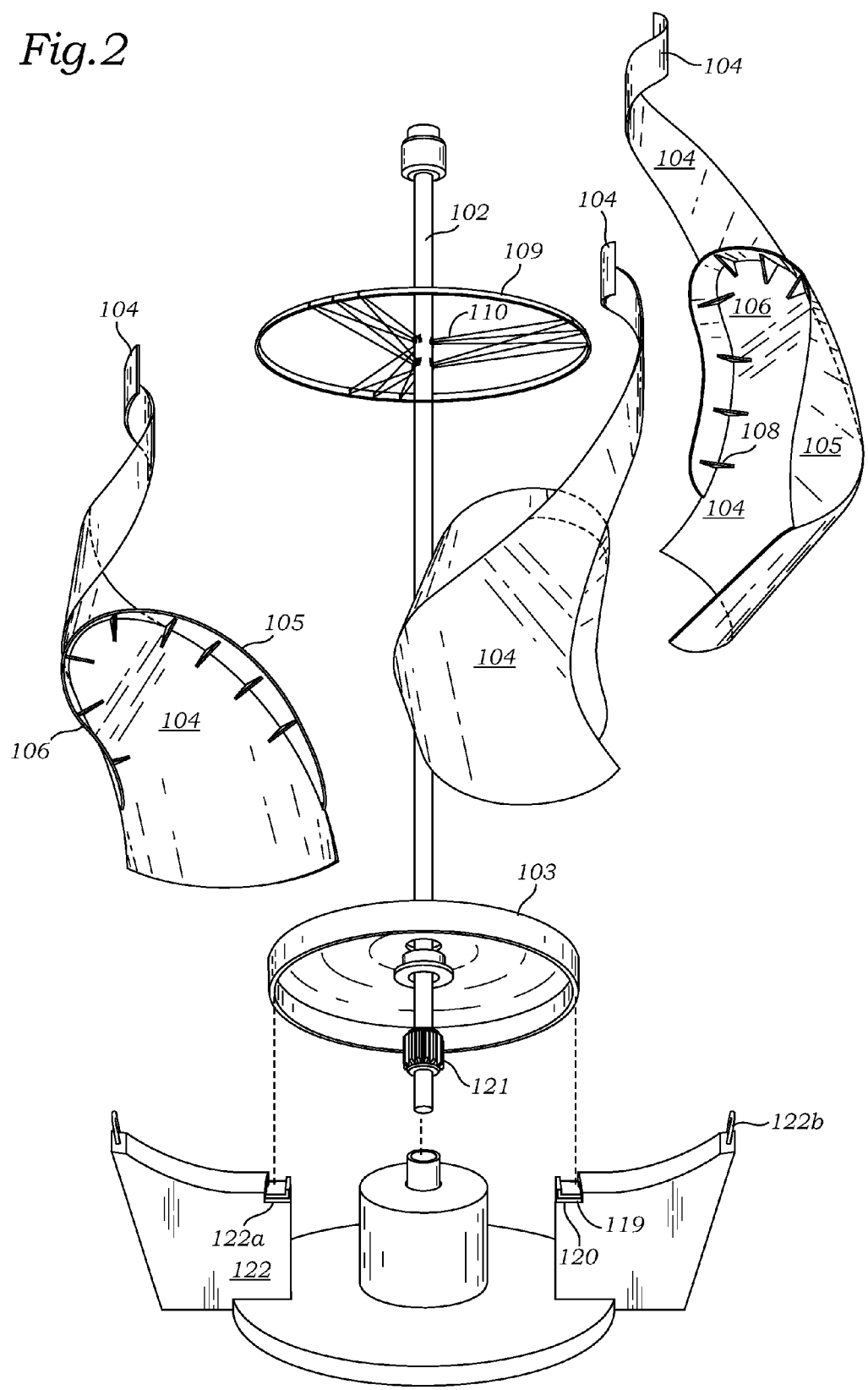
FIG. 2 is an isomeric exploded view of the turbine shown in FIG. 1 (not all items shown for clarity).
Figure 4A:
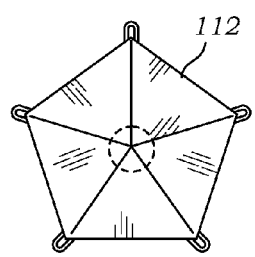
Figure 4B:
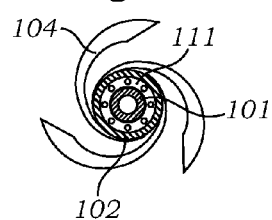
Figure 4C:
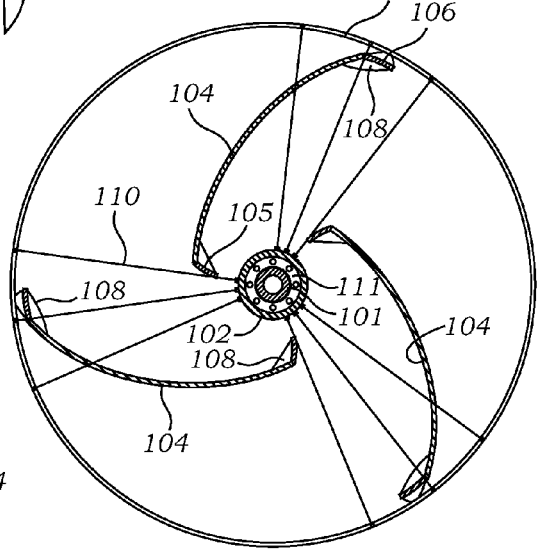
Figure 4D:
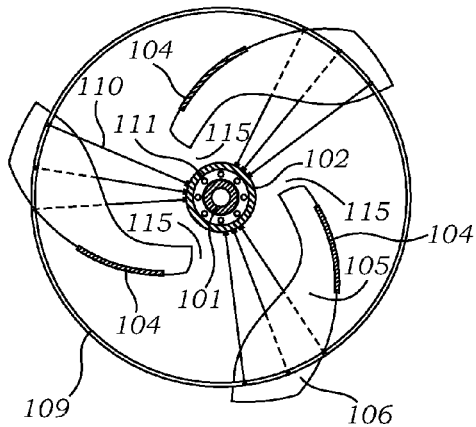
Figure 4E:
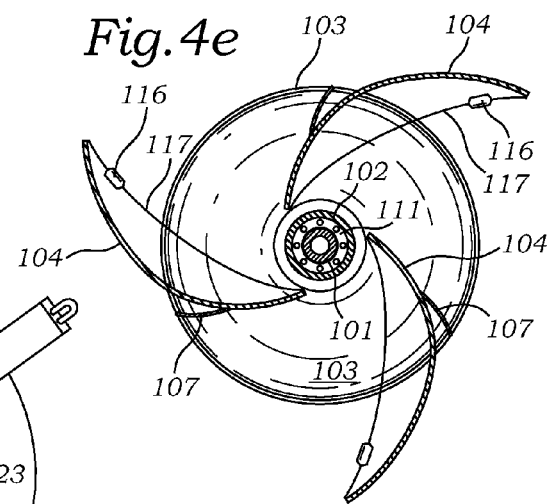
Figure 4F:
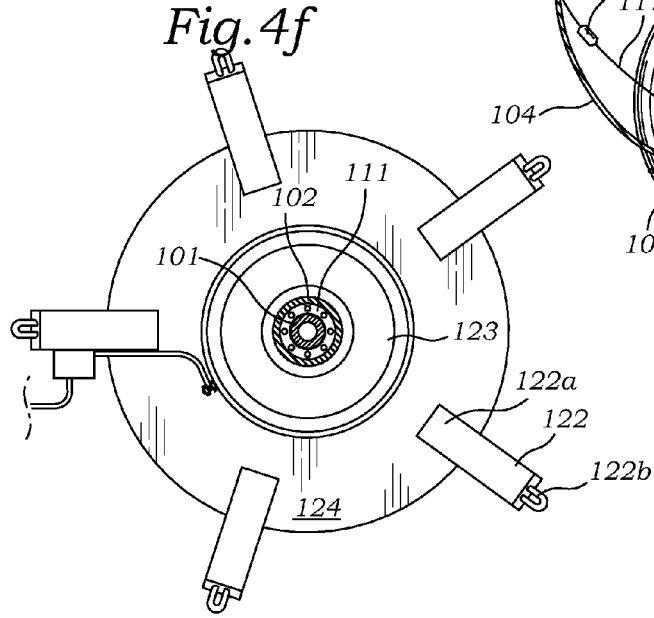

As shown in the exemplary embodiment of FIGS. 1, 2 and 3, each blade 104 comprises one inner brow 105-106, which is located from one edge over to the other edge of the blades 104, and one optional outer brow 107 as shown FIGS. 3 and 4e, which is located in the lower third back of the blade 104 and is also attached to the dome 103. The brows 105-106 and 107 are angled away and open from the adjacent plane of the blade 104, this configuration permits the brow 105-106, and its associated blade 104 to collectively form a cup like space in the front and the brow 107 and its associated back of the blade 104 and top of the dome 103 to form an open wedge in the back, to assist in catching and resisting the wind kinetic force, thereby driving the rotation of the vertical rotating axle 102. The brows also have corresponding smooth and rough surfaces inside and out as previously described.

The vertical-axis wind turbine 100 may further comprise one or more rings 109 with corresponding spokes 110 to stiffen and maintain open the blades 104 and the cup like space formed by the blades 104 and brow 105-106. For example, as shown in FIGS. 1, 3, 4c and 4d, two rings 109 are attached to the blades 104 and the brows 105-106, one near the top third of the turbine 100 and another near the bottom third. These two rings 109 and corresponding spokes 110 attached to the wings 104 the brows 105-106 and rotating vertical axle 102 collectively form a complex and compound truss to strengthen and lighten the turbine 100. Additional rings 109 with corresponding spokes 110 may be implemented to further strengthen the turbine.

The blades 104 and brows 105-106 and 107 may further comprise various optional triangular wedge stiffeners 108 for high speed wind locations. In an exemplary embodiment, the stiffeners 108 are triangular wedge-like rigid structure reinforcements coupled between the blade 104 and each respective brow 105-106 and 107. The inclusion of stiffeners 108 further strengthens and maintains the shapes of the blades 104 and brows 105-106 and 107 while lightening the turbine 100.

As shown in FIGS. 2, 3 and 4b, 4c, 4d and 4e, three blades 104 are implemented, although one of ordinary skill in the art readily appreciates that this exemplary number may vary. For example, any reasonable number of blades 104 with corresponding brows 105-106 and 107 and stiffeners 108 may be implemented. Regardless of the number of blades 104 employed, the radial width and shape of each blade 104 increases from to top to bottom as shown as shown in FIGS. 1, 2, 3, 5, 6, and 7. In other words, the radial width of each blade 104 is greatest at the base where coupled and angled to the dome 103, continues wide for about (½) the length of the blade 104, and then decreases to a relatively narrow strip near the top of the turbine 100 where it is attached to the rotating axle 102, as shown in FIGS. 1, 3, 4b and 7.

In an exemplary embodiment of the invention, each blade 104 features a helical or spiral and concave design as shown in FIGS. 1, 2, 3 and 4b-e. For example, at the bottom of the turbine 100, the shape of each blade 104 is concave upwards and angles sharply in the back in a smooth transition away from the upper surface of the base dome 103. At about ½ in height, each blade 104 bends forward to form the cup like space with its associated brow 105-106 at about ⅔ height. At about the last ⅓ of the blade 104 as it extends up to the top, the blade 104 twists around and attaches to the vertical rotating axle 102 just below the umbrella structure 112.

The dome 103, the blades 104, the brows 105-106, and 107, and the stiffeners 108 are collectively welded or attached as shown in FIGS. 1, 3, 4c, 4d, and 4e to form a solid single piece of equipment that twists around the axis of the turbine 100 from top to bottom but mostly at the top. The twisted blades 104 with wide and concave lower parts in conjunction with the brow 105-106 form the cup like space at about ⅔ blade height that catches the wind and forces the rotation of the vertical axle 102 around its axis. The twisting of the blades 104 around the rotating axle 102 can be installed to the right or to the left. In turbine farms they should alternate to even out torque forces created by the twisting.

Figure 7:
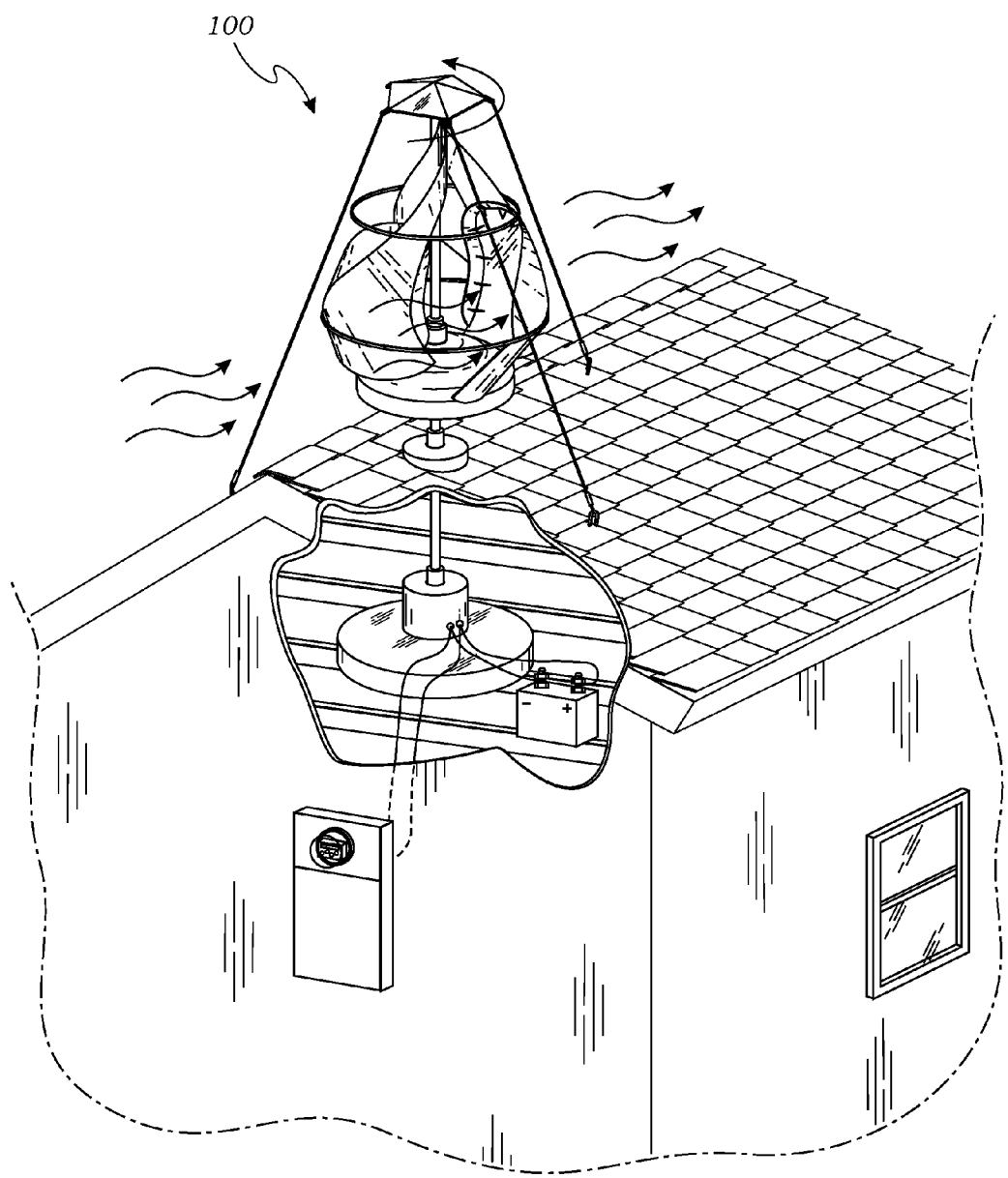
FIG. 7 Shows an illustration of a turbine located on the roof of a house depicting a possible application. Some turbines may not require foundations as shown.

As depicted in FIGS. 1, 3 and 7, diagonal supports 113 are implemented to vertically support the turbine 100. These diagonal supports 113 are structural and are placed diagonally, radially, and equidistantly from the central axis of the turbine 100. These diagonal supports 113 may comprise beams, posts, pipes, or flexible strong cables and each include a mechanical length adjuster, such as a turnbuckle 114, or bolts etc. to properly plumb the turbine 100. In an embodiment of the invention, one end of each diagonal support 113 is anchored to an end of the umbrella like structure 112 located at or near the very top of the turbine 100, radially and equidistant around the turbines perimeter. The other end of each diagonal support 113 is anchored to the outer high point 122b of the elevated foundation 122, made of concrete steel or the like. At the base of the turbine 100. A radial set of cables of any number 3 or above will do, anchored from the foundation pedestal high point below 122b to the umbrella like structure 112 above, maintains the turbine 100 plumb, and wide enough to clear the turbine rotating space 104a shown in FIG. 3. In an embodiment of the invention the cables are attached from top of the turbine to a conventional footing on the ground.

To further strengthen the blade 104 brows 105-106 configuration, spokes 110 emanating outward from the vertical rotating axle 102 through and attached to the blades 104, brows 105-106, and ending at the rings 109 may optionally be implemented when size of turbine and force of wind demands. For example, a plurality of spokes 110 offset at equal angles are connected by conventional means to the vertical rotating axle 102 and either to blade 104, brow 105-106, and ring 109 or to all. The spokes 110 working with the rings 109 to further strengthen and add stability to the blades 104 and brows 105-106 help maintain the cup like space open at all times. In an embodiment of the invention, the rings 109 are attached to wings 104 and the outer-upper-edge of brow 105-106. The spokes 110 are attached from the vertical rotating axle 102 to the ring 109 like a bicycle wheel. The spokes 110 are implemented in pairs, top and bottom, at a minimum three locations per blade 104 and brow 105-106, for a total of eighteen (18) spokes minimum per ring 109 in a three blade 104 configuration.

At the top of the vertical axis 101 or 102 is the umbrella like support structure 112, to which the diagonal supports 113 are attached at their ends. The umbrella like support structure 112 includes conventional ball-bearings 111 or the like disposed between it and the vertical rotating axle 102. This enables the vertical axle 102 to rotate freely while the umbrella like support structure 112 and with its diagonal support stays in place. In an embodiment of the invention, ball-bearing 111 units are placed between the vertical rotating axle 102 and fixed axis 101 at certain points. For example, ball-bearings 111 may be placed at the top and bottom of the turbine 100 and in between the vertical rotating axle 102 and vertical fixed axle 101 at high stress points. In another embodiment of the invention, the vertical rotating axle 102, without the fixed axle 101, is attached at the top to the umbrella like support structure 112 and to the central foundation 124 at the bottom, via ball bearings 111, so that the axle rotates freely.

Between the blades 104 and the brows 105-106 and the vertical rotating axle 102 is an open area 115 to allow wind through and create a wind vortex through the middle and up and out of the turbine 100.

Referring particularly to FIG. 4e, the turbine may further include one or more conventional counter weights 116 per blade 104 that travels along a radial guide 117 see FIG. 4e. As the turbine 100 increases rotation, the counter weights 116 will travel along the guide 117 due to centrifugal forces. When the velocity of the wind applied to the turbine 100 subsequently decreases, the counter weights 116 will reverse direction releasing conserved energy, thereby maintaining rotation for some extra time as a result of conservation of angular momentum. The counter weights 116 also make it easier for the wind to start rotating the blades 104 by keeping the center of gravity close to the center of the turbine. The weights move in and out equidistantly and uniformly from the center axis to maintain the center of gravity.

The turbine 100 may further include a winding coil or spring 118 see FIG. 3 disposed directly under the dome 104 and attached to the vertical rotating axle 102. The spring 118 acts or reacts in the same manner as a conventional spring or coil in a self winding wrist watch and serves to extend duration of rotation of the turbine 100 at low speed winds by releasing stored energy. One or more coils can be implemented.

The turbine 100 further comprises an optional conventional transmission or direct drive gear system 121 to convert the angular velocity of the vertical rotating axis 102 into a different angular velocity, usually greater, to better drive a conventional electrical generator 123. Although not the primary focus of this description, any type of gear system 121 and electrical generator 123 may be used, the identification and implementation of which is apparent to one of ordinary skill in the art.

The turbine 100 further comprises a radial raised foundation 122 with two high points 122a and 122b, lower inside point 122a where the guiding-braking system 119 120 installed and a higher outer point 122b where the support cable 113 is anchored. This outer point 122b is located out, far enough, so that the support cables 113 connected to the umbrella like support 112 at top of the turbine 100 will clear the turbine rotation edge 104a see FIG. 3, and shorten the length needed for each support cable 113. The raised foundation 122 is preferably constructed from a heavy strong and solid materials such as concrete, structural steel or a combination of both in order to provide a stable foundation for the turbine 100.

In an embodiment of the invention, a guiding braking system 119-120 located within the radial raised foundations inner lower high point 122a and placed so that the edge of the dome 103 is guided through it, to control the angular velocity of the turbine 100 as needed. For example, a conventional mechanical brake 120 can be used to slow down the velocity or hold down the turbine at rest for maintenance.

FIGS. 3 and 4a-4f illustrate horizontal cross-section views taken along the vertical axis wind turbine 100. Particularly, FIG. 3 illustrates a diagrammatic elevation of the wind turbine 100 showing only two blades 104, for clarity purposes only, with six horizontal cross-sections taken at different heights and shown as FIG. 4a-4f each looking down on the turbine 100 shown a three blade configuration.

Figures 5A, 5B, 5C:
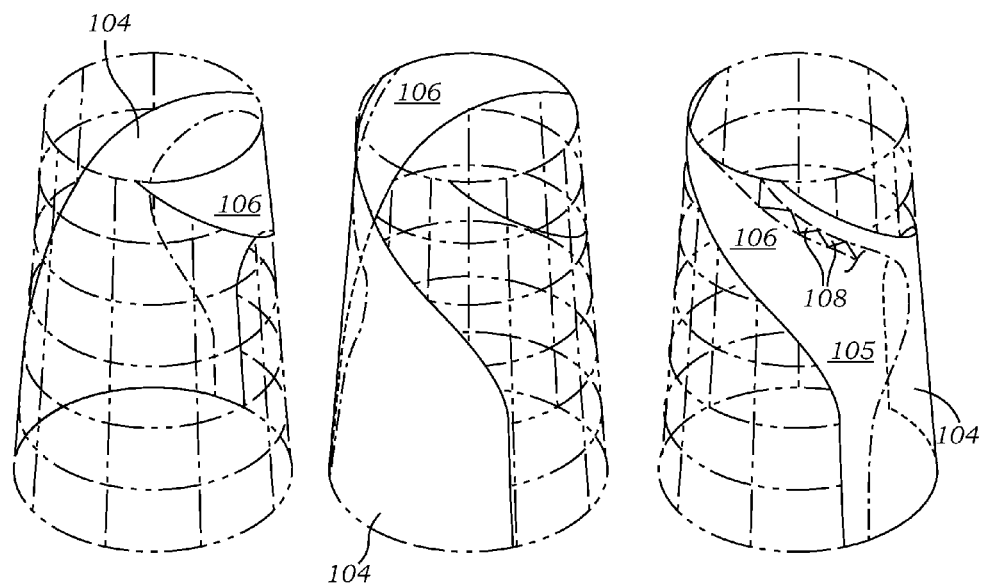
FIG. 5a-5c are three frustum of the same cone separately showing the outlines of the three blades and brows illustrated in FIGS. 1 and 2 outlined. If all 3 frustums are over impose it will show all 3 wings and 3 brows out of one frustum.
Figure 6:
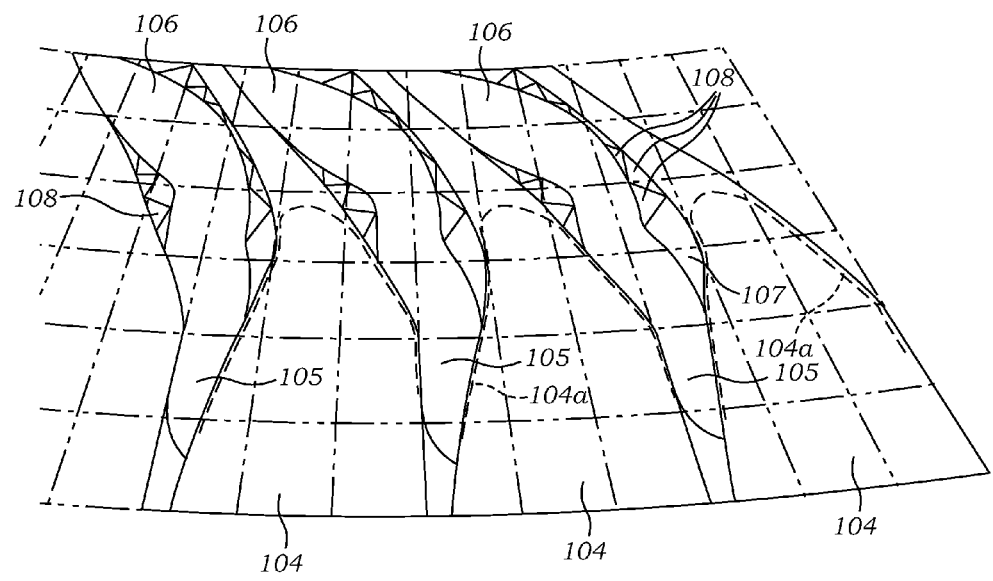
FIG. 6 is a spread cut-out of the frustum of the cone shown in FIGS. 5a-5c, illustrated and cut along the outer edge of a blade and depicting the blades brows and stiffeners.

FIGS. 5a 5b and 5c illustrate a frustum of a cone (i.e. a truncated cone) from which the proportions, dimensions and shapes of the blades, brows and stiffeners may be formed according to an embodiment of the invention. A frustum of a cone is the part that is left when a cone is cut by a plane parallel to the base and the apical part is removed. Those figures illustrates three dimensional frustums each one showing the blade 104 and respective brows 105-106 and stiffeners 108. FIG. 6 illustrates a flat and spread out diagram of where the blades 104, the brows 105-106, and the stiffeners 108 can be "cut-out" from the frustum that is divided horizontally in six (6) equal sections and vertically into nine (9) equal sections forming 54 trapezoids. When the frustum is spread flat as shown in FIG. 6 (i.e., into two dimensions), three blades 104, three sets of brows 105-106, and many stiffeners 108 may be formed and joined all together to the base dome 103 as described above, forming the mechanism that catches the kinetic energy of the wind. This is but one way of achieving the desired blade/brow form, but not the only one.

It should be appreciated that the scale and dimension of the turbine 100 as shown are exemplary only. The height width footprint and or diameter of the overall turbine 100 may be varied. The turbine 100 can be short stout thin or tall, and can be 10', 20', 50', and 100', tall or even taller, with diameters proportional to height.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A vertical axis wind turbine comprising:
   a vertical axle; and,
   a plurality of blades with brows, each blade coupled at its upper portion to an upper portion of the axle, and each blade also coupled at their bottom portion to a base that is, in turn, coupled to the vertical axle.

2. The wind turbine of claim 1, wherein each of the plurality of blades wrap around the vertical axle at a greater frequency as they reach the top of the axle.

3. The wind turbine of claim 1, wherein each of the plurality of blades has a radial width that increases from the upper to the bottom portion.

4. The wind turbine of claim 1, wherein the base is shaped as a convex dome.

5. The wind turbine of claim 4, wherein the base dome is shaped like an upside down flat bowl for deflecting wind up into the plurality of blades.

6. The wind turbine of claim 4 where the plurality of blades are attached and angled to the adjacent plane of the dome in the front to form an obtuse angle and in the back to form an acute angle.

7. The wind turbine of claim 1 wherein each blade and brow includes a set of stiffener Sections.

8. The wind turbine of claim 7, wherein the plurality of blades and brows are formed from a surface of frustum of a cone or a cylinder or have the shape as if they were cut out from the frustum of a cone or cylinder.

9. The wind turbine of claim 7, wherein the stiffeners are triangular wedge-like structures disposed between the blades and the brow sections.

10. The wind turbine of claim 1, wherein each of the plurality of blades includes a rough inside and a smooth outside surface.

11. The wind turbine of claim 1, where the brows are attached to the edges of the respective blades at an obtuse angle forming a cup-like space.

12. The wind turbine of claim 1, further comprising one or more rings coupled to each of the plurality of blades, brow sections.

13. The wind turbine of claim 12 wherein the rings are supported by multiple radial spokes.

14. The wind turbine of claim 13, where the blades', brow sections, rings, and vertical axle form a compound complex 3D truss for support.

15. The wind turbine of claim 1, further comprising one or more counter weights per blade and respective radial guides, the counter weights travelling along the radial guides to store and release energy.

16. The wind turbine of claim 1, wherein the blade bends forward at about ½ its height forming an aerodynamic curve in their back portions' for reducing the drag on the back of the blade.

17. The wind turbine of claim 1, wherein the bottom of the blades is a concave in front for directing wind to a cup-like space formed by the blade and brow; and further, the bottom of the blades is convex in back, for directing wind to the edges of the blade.

18. A vertical axis wind turbine comprising at least three blade assemblies, a blade assembly comprising:
   a. a twisted, elongated blade significantly narrower at its upper portion than at its lower portion; further, the lower extremity of said bade having an arcuate shape along a line transverse to the major plane of the blade;
   b. a brow, coupled from the outer edge to the inner edge of its respective bade in a plane generally transverse to that of the proximate portion of the blade such as to form a partial cup structure;
   said at least three blades mutually, radially, symmetrically arranged around an axis of rotation and inter-coupled as to prevent mutual relative movement; further, said blades so-mounted as to be rotable around the axis.

19. The wind turbine of claim 18 wherein the relationship between the major plane of the brow and its corresponding blade portion is generally at an obtuse, open angle.

* * * * *